June 23, 1953 V. H. HASSELQUIST 2,643,116
APPARATUS FOR CONTROLLING A WEB OF SHEET MATERIAL
Filed Feb. 25, 1949

Inventor
Victor H. Hasselquist
By [signature]
Atty

Patented June 23, 1953

2,643,116

UNITED STATES PATENT OFFICE 2,643,116

APPARATUS FOR CONTROLLING A WEB OF SHEET MATERIAL

Victor H. Hasselquist, Akron, Ohio, assignor to The B. F. Goodrich Company, New York, N. Y., a corporation of New York Application February 25, 1949, Serial No. 78,411

4 Claims. (Cl. 271—2.6)

This invention relates to apparatus for laterally shifting a travelling web of material and is useful in controlling the course of a travelling band or belt or for stretching sheet materials laterally.

In the processing of textile materials it is often desirable to stretch materials laterally while they are travelling longitudinally, particularly during the drying of dyed fabrics. Apparatus heretofore proposed for the purpose has comprised a drum or barrel having axially movable staves on its surface controlled by fixed cams. With such apparatus, the width of the individual staves and their rigidity permitted only a step-by-step axial movement resulting in damage to the fabric, the staves were warped by contact with the wet fabrics, and the devices were noisy in operation.

In the driving of endless flat belts, especially of great width and short length, the belts have tended to run toward one side of the pulleys requiring some guiding or compensating means to keep them running in the desired path. Devices heretofore proposed for this purpose have been only partially successful in use, have been of complex construction, have been expensive to build, and have been uncertain in operation.

This invention has for one of its objects to overcome the foregoing and other difficulties.

Other objects are to provide a drum or pulley having a shiftably distortable surface, to provide such a drum with a surface not affected by water or chemicals, to provide such a structure not requiring lubrication, and to provide with such a drum or pulley, means for shifting its surface as desired.

These and other objects will appear from the following description and the accompanying drawings.

Figure 1:
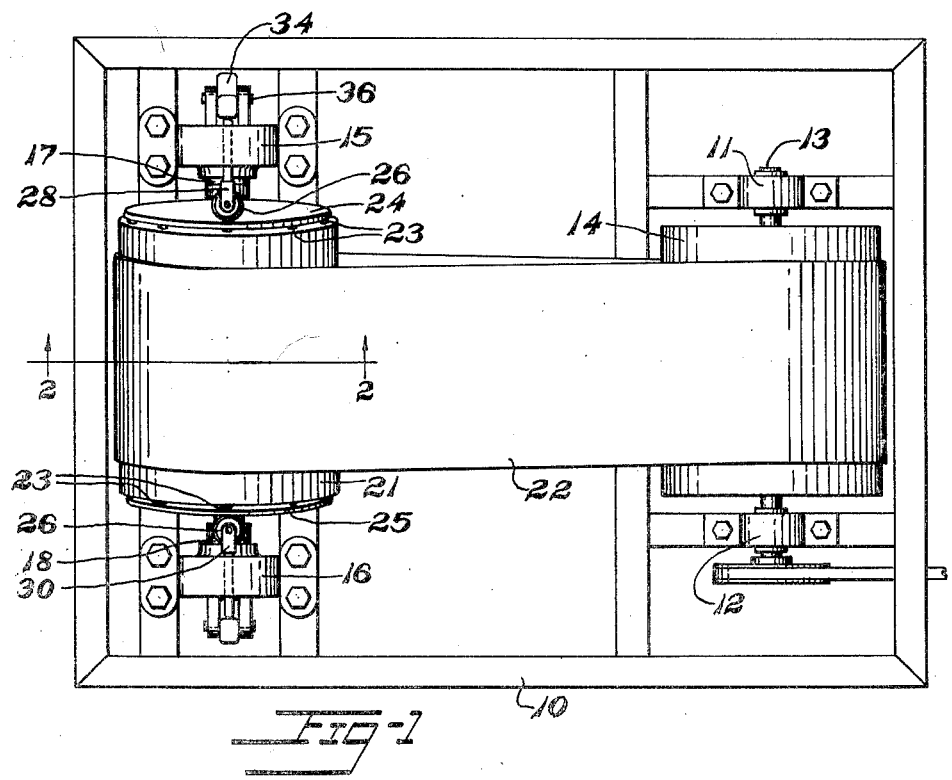
Fig. 1 is a plan view of a belt and its supporting pulleys embodying therein one of the pulleys of the present invention.
Figures 2, 3:
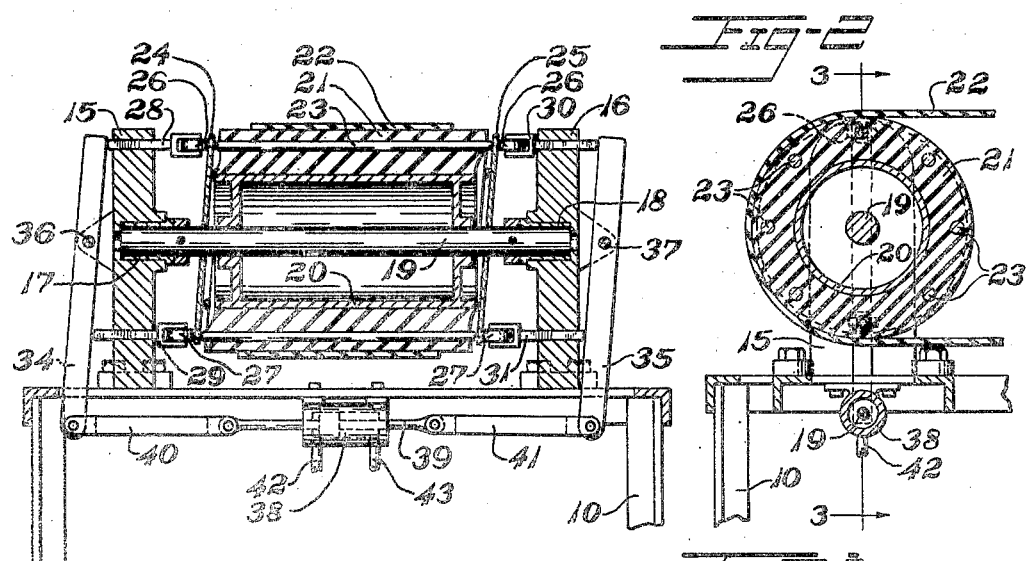
Fig. 2 is a section of the pulley and its control apparatus, taken on line 2—2 of Fig. 1.
Fig. 3 is a longitudinal sectional view thereof taken on line 3—3 of Fig. 2.

Referring to the drawings, the numeral 10 designates a support providing bearings 11, 12 for a shaft 13 to which a pulley 14 is secured.

Mounted on the frame 10 are supports 15, 16 having bearings 17, 18 for a shaft 19 parallel to shaft 13. A drum 20 is fixed to shaft 19 and has a thick cover 21 of resilient material such as soft vulcanized rubber or other rubber-like material bonded to its surface and providing a distortable water-proof belt-engaging surface for engagement with an endless belt 22 trained about the drum and the pulley 14.

Also embedded in the cover 21 beneath its outer surface and parallel to its axis at spaced intervals about the drum are a series of stiff cam-follower rods 23, preferably of metal bonded to the distortable cover. The ends of the rods preferably extend slightly beyond the cover and are preferably rounded. A pair of stiff discs 24, 25 each having a central opening slightly larger than the shaft 19 are loosely mounted on the shaft, one at each end of the drum in contact with the ends of the rods 23. The discs are held in contact with the rods by guide rollers 26, 27 diametrically positioned in holders 28, 29 on support 15 and similar guide rollers 30, 31 supported opposite rollers 26, 27 on support 16.

For controlling the guide rollers 26, 27, 30 and 31, a pair of levers 34, 35 are pivotally mounted on frame members 15, 16 respectively, as at 36, 37 in alignment with the axis of shaft 19. A double-acting fluid pressure operated cylinder 38 is mounted on the frame of the apparatus and its piston rod 39 is connected to the levers 34, 35 by links 40, 41 respectively. Pressure fluid may be admitted to opposite ends of the cylinder by means of pipes 42, 43. By means of the force developed in the cylinder 38, the levers 34, 35 may be tilted, thereby forcing the plates 24, 25 to assume a position oblique to the axis of shaft 19 where the plates act as cams or swash plates to control axial disposition of the rods 23 and due to the bonding of the rods to the resilient covering 21, the covering is shifted axially by distortion relative to the drum 20 thereby shifting the belt in its passage about the drum.

Variations may be made without departing from the scope of the invention as it is defined by the following claims.

I claim:

1. Apparatus for laterally shifting a travelling web of sheet material, said apparatus comprising a rotatable drum having a thick continuous layer of distortable resilient material bonded thereto about its face and formed to receive the web, said layer having a peripheral surface for engaging the web of material and substantially unconfined ends, relatively non-rotatable cam means at one end of the layer and opposed to one of said ends, and cam follower means including rigid means carried by said one end of said rubber material, said cam follower means engaging said cam means during drum rotation for effecting axial distortion of said layer of resilient material by deflecting pressure applied to said one end to shift the travelling web.

2. Apparatus for laterally shifting a travelling web of sheet material, said apparatus comprising a rotatable drum having a thick continuous layer of distortable resilient material bonded thereto about its face, said layer having a peripheral surface for engaging the web of material, cam-follower means rotatable with said drum at an end of said layer of resilient material inwardly of the peripheral surface of said layer and exposed at an end of said layer, and cam means at said end of the layer and opposed to said layer in contact with said cam-follower means for effecting axial distortion of said peripheral surface by relative rotational movement of said drum and said cam means to shift the travelling web.

3. Apparatus for laterally shifting a travelling web of sheet material, said apparatus comprising a rotatable drum having a thick layer of distortable resilient material bonded thereto about its face, said layer having a peripheral surface for engaging the web of material, cam-follower means embedded in and bonded to said layer of resilient material inwardly of its peripheral surface and exposed at an end of said layer, and relatively non-rotatable cam means at said end of the layer and opposed to said embedded cam-follower means for effecting axial movement of said cam-follower means during rotation of said drum and consequent axial distortion of said resilient material to shift the travelling web.

4. Apparatus for laterally shifting a travelling web of sheet material, said apparatus comprising a rotatable drum having a thick layer of distortable resilient material bonded thereto about its face, said layer having a peripheral surface for engaging the web of material, cam-follower members extending axially of said drum through said layer of resilient material inwardly of its peripheral surface and bonded to said layer and extending therebeyond at the ends of said layer, and cam means at the ends of said layer and non-rotatable relative to said drum engaging said cam-follower members for effecting axial movement of said members during rotation of said drum and consequent axial distortion of said resilient material to shift the travelling web.

VICTOR H. HASSELQUIST.

References Cited in the file of this patent

UNITED STATES PATENTS

| Number | Name | Date |
|---|---|---|
| 2,067,300 | Willis et al. | Jan. 12, 1937 |
| 2,171,551 | Hannig | Sept. 5, 1939 |
| 2,312,182 | Meyer | Feb. 23, 1943 |
| 2,350,509 | Hlavaty | June 6, 1944 |